United States Patent [19]

Julius

[11] Patent Number: 4,793,749

[45] Date of Patent: Dec. 27, 1988

[54] PROCESS FOR EDGING METAL STRIP MATERIAL AND A LINEAR GUIDE THEREFOR

[75] Inventor: Rolf Julius, Wülfrath, Fed. Rep. of Germany

[73] Assignee: Julius Maschinenbau GmbH, Wuelfrath, Fed. Rep. of Germany

[21] Appl. No.: 20,112

[22] Filed: Feb. 27, 1987

[30] Foreign Application Priority Data

Feb. 28, 1986 [EP] European Pat. Off. ........ 86102595.5

[51] Int. Cl.$^4$ ................................................ B23C 3/12
[52] U.S. Cl. ........................................ 409/132; 226/7; 226/97; 409/138; 409/258; 409/298; 409/303
[58] Field of Search ................................ 409/136–140, 409/131, 132, 258, 297, 298, 301, 303; 226/97, 7; 51/DIG. 8; 83/22, 24, 402; 269/20, 35

[56] References Cited

U.S. PATENT DOCUMENTS

| 1,584,199 | 5/1926 | Stroebel | 251/216 X |
| 4,406,388 | 9/1983 | Takashi et al. | 266/7 |
| 4,642,004 | 2/1987 | Matifas | 409/136 |
| 4,648,762 | 3/1987 | Hall et al. | 409/138 |
| 4,673,447 | 6/1987 | Sakai et al. | 226/7 X |

Primary Examiner—Gil Weidenfeld
Assistant Examiner—Steven C. Bishop
Attorney, Agent, or Firm—Felfe & Lynch

[57] ABSTRACT

In a process for edging metal strips, especially nonferrous metal strips, by means of an edging machine wherein the longitudinally driven metal strip is guided between an upper and a lower linear guide and cutting tools are disposed successively along the line of movement of the strip, on either side of the linear guides. It is proposed according to the invention that a liquid or gaseous fluid be forced out of the central part of the linear guides at individual points along the line of movement, into the clearance between the metal strip and the linear guides. In a linear guide for carrying out this process, provision is made according to the invention such that, in each linear guide face confronting the metal strip, there are a series of grooves running longitudinally along the center of the guide, the grooves being separate from one another and connected to inlets for the fluid. These measures assure, by means of the pressure cushion that forms in operation, that the friction and hence the driving force becomes extremely low, that the chips produced from the material are reliably kept out of the area between the linear guide tracks and the metal strip, and that the surfaces of the metal strip are protected against damage.

20 Claims, 4 Drawing Sheets

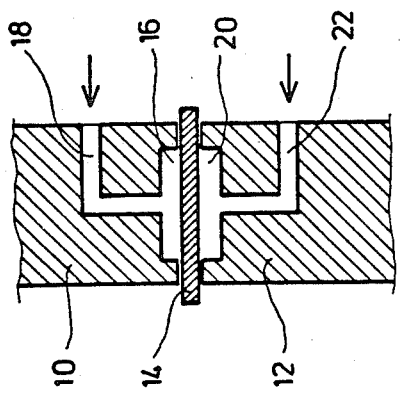
Fig.1
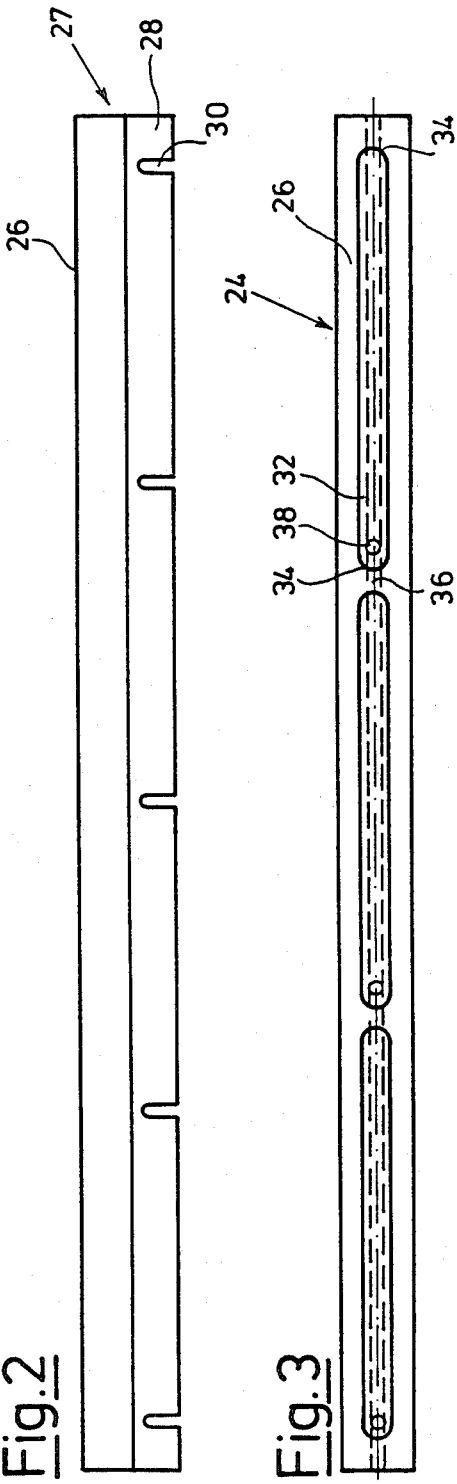
Fig.2
Fig.3

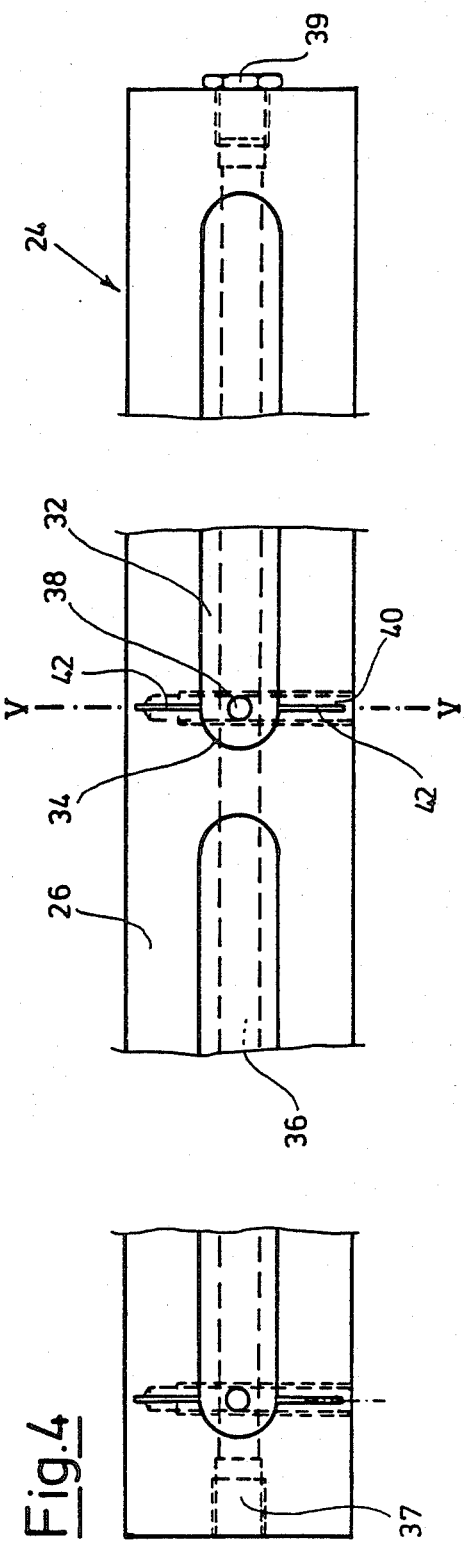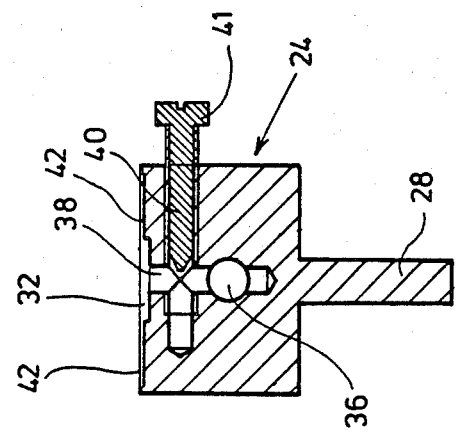

PROCESS FOR EDGING METAL STRIP MATERIAL AND A LINEAR GUIDE THEREFOR

BACKGROUND OF THE INVENTION

The invention relates to a process for edging metal strip, especially by means of an edging machine, and a linear guide for carrying out this process.

Edging machines of the kind referred to have long been known and serve for trimming as well as chamfering the edges of metal strip material. It is disadvantageous in such machines that, during machining, chips can easily become lodged between the guiding faces of the linear guide and the surfaces of the metal strip. This interferes with the movement of the strip and there is a danger of damage to the surface. It is also disadvantageous that great force is often needed to propel the metal strip on account of the friction between the guiding faces and the strip surfaces. It is especially on account of these difficulties that the speed of movement of the strip is greatly limited. Attempts have been made to eliminate these disadvantages by the use of friction-reducing Teflon coatings, but such coatings have proven to be too susceptible to wear.

The present invention is therefore addressed to the problem of designing a process for edging metal strip and a linear guide for carrying out this process, such that no interference will be produced by chips penetrating into the area of contact, while the friction and driving force of the strip will be minimized.

SUMMARY OF THE INVENTION

This problem is solved, according to the present invention, by forcing a gaseous or liquid fluid under pressure from the middle to the edges of the linear guides between the metal strip and these linear guides at individual points along the line of movement of the strip. This fluid, which, for example, can be a cutting oil emulsion or compressed air, serves to guide the metal strip in a largely friction-free manner and to remove the metal chips directly with the fluid issuing laterally from the area of contact.

This basic employment of this floating principle in an edging machine brings about an extremely low driving force so that there is no danger of damage to the guide or to the strip, and very high strip speeds can be attained. It has furthermore been found that precisely the feeding of fluid at points spaced apart in the longitudinal direction is of particular advantage to the entire operation of the system.

A suitable for the performance of the process according to the invention is furthermore characterized by longitudinal grooves running approximately centrally along the length of the guide. These grooves are formed in the side of the guide that faces the metal strip, and are connected to the inlets through which the fluid is delivered. These individual grooves are particularly well suited for feeding the fluid through individual longitudinal sections of the guide, while exits for the fluid are deliberately omitted in the areas between adjacent grooves. Since fluid can enter these areas from the adjacent grooves and can exit therefrom, a sufficient reduction of friction is assured. The ungrooved portions of the guiding faces of the linear guide provide for a better guidance of the metal strip by their broad-area engagement with the strip.

In a further development of the invention, the groove width should be relatively great and should correspond to at least one-third of the width of the adjacent guiding face. This results in a relatively large area of pressure on the metal strip, resulting in an extremely effective pressure cushion. The longitudinal separation between adjacent longitudinal grooves should be of the same order of magnitude as the essential groove width. This spacing, which suffices for the achievement of the desired good strip guidance and, for an effective floating action, should not be made substantially larger.

In a first preferred embodiment of the linear guide, the widths of the linear guide and of the longitudinal grooves should remain substantially equal over their lengths. This embodiment is especially simple and has proven to be entirely adequate. If transverse grooves of lesser depth are embedded in the guiding faces of the guide in the area of the inlets, additional advantages can be achieved as a result of this machining. In this manner, extremely low friction forces can be achieved, along with a highly effective blocking of chips from the gap between the metal strip and the guide.

In a further development, the inlets of the individual longitudinal grooves can be situated always in the leading portion thereof, with respect to the direction of strip movement. These inlets are advantageously connected to a passage running in the interior of the guide track in the lengthwise direction of the latter. It is desirable to associate with each inlet a throttle screw which can be rotated in a threaded bore to regulate the rate of flow of the fluid by varying the cross section.

For a full understanding of the present invention, reference should now be made to the following detailed description of the preferred embodiments of the invention and to the accompanying drawings.

BRIEF DESCRIPTION OF THE DRAWINGS

FIG. 1 is a fragmentary cross-sectional view of two confronting linear guides of an edging machine with a metal strip between them.

FIG. 2 is a side elevational view of a first embodiment of a linear guide (two of which are required for an edging machine).

FIG. 3 is a plan view of the guiding face of the linear guide of FIG. 2 showing the longitudinal grooves.

FIG. 4 is an enlarged fragmentary plan view of the guiding face of the linear guide of FIG. 2 showing the longitudinal grooves.

FIG. 5 is a cross-sectional view taken along the line of V—V of FIG. 4.

DESCRIPTION OF PREFERRED EMBODIMENTS

Figure 6:
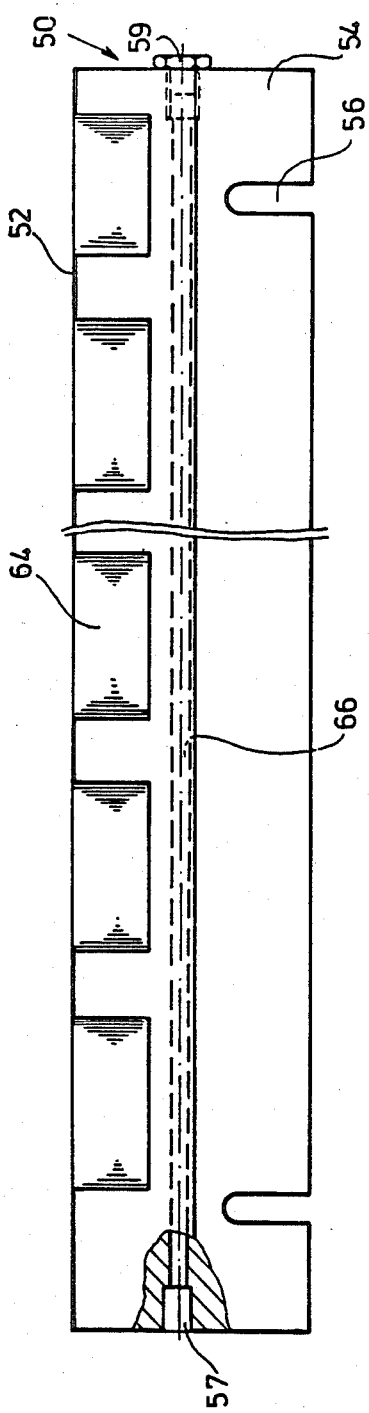
FIG. 6 is a side elevational of a second embodiment of a linear guide.

The preferred embodiment of the present invention will now be described with reference to FIGS. 1–10 of the drawings. Identical elements in the figures are designed with the same reference numerals.

According to FIG. 1, a metal strip 14 is situated between the confronting guiding faces of an upper linear guide 10 and a lower linear guide 12. These upper and lower linear guides 10 and 12 are essentially identical and will be described in detail below. The metal strip is guided with a small clearance between the guiding faces of the linear guides 10 and 12 and is driven in a direction at right angles to the plane of the drawing. Laterally of the linear guides 10 and 12 and the metal strip 14, a series of cutting tools (tools 80, 81 shown in FIG. 10), arranged successively along the length of the guides, provide for the edging, i.e., trimming and chamfering, for example, of the strip. Longitudinal grooves 16 and 20 are situated in the guiding faces of the linear guides 10 and 12, respectively, and are fed in the direction of the arrows with fluid through connections 18 and 22, respectively. This fluid is forced under pressure into the longitudinal grooves 16 and 20, so that it forms a cushion that effectively reduces the friction. At the same time, fluid exits laterally through the slight clearance between the guiding faces and the metal strip, so that the chips produced on the sides cannot intrude into the gap. In this manner, extremely low friction i achieved, as well as good guidance. Metal chips are securely kept out of the gap in which the strip moves and is guided, and the surfaces of the metal strip are protected against damage.

In a first embodiment in accordance with FIGS. 2 to 5, a single, individual linear guide 24 has a guiding face 26 and a mounting flange 28 with mounting slots 30 in back of the guiding face. In the guiding face 26 there are provided longitudinal grooves 32 having semicircular terminations 34. These grooves are situated approximately centrally in the guiding face 26 and run longitudinally thereof, and are spaced apart from one another longitudinally. At the beginning of each longitudinal groove 32, in the direction of movement of the strip, there is an inlet 38 for the fluid. The inlets 38 are each connected to a passage 36 running lengthwise within the linear guide 24. The rate of flow of the fluid can be regulated by means of a throttle screw 41 which can be turned in a threaded bore 40. The fluid is fed into the passage 36 from the outside through a connection 37. At the opposite end of the guide track 24 the passage 36 is closed with a plug 39.

As seen in FIGS. 4 and 5, an additional groove 42 running traversely of the groove 32 can be embedded in the guiding face 26 at the inlets 38, this groove 42 being substantially narrower and shallower than groove 32. In the present case, the groove 42 extends over nearly the entire width of the guiding face 26 and serves to carry fluid also into the lateral edge portion of the guide.

In a second embodiment in accordance with FIGS. 6 to 9, a linear guide 50 again has a guiding face 52 and, on the opposite side, a narrower mounting flange 54 with mounting slots 56. In the guiding face 52, there are again the longitudinal grooves 58 running lengthwise thereof at a distance apart, but in contrast to the previous embodiment, they have a width that varies in the lengthwise direction.

Figure 7:
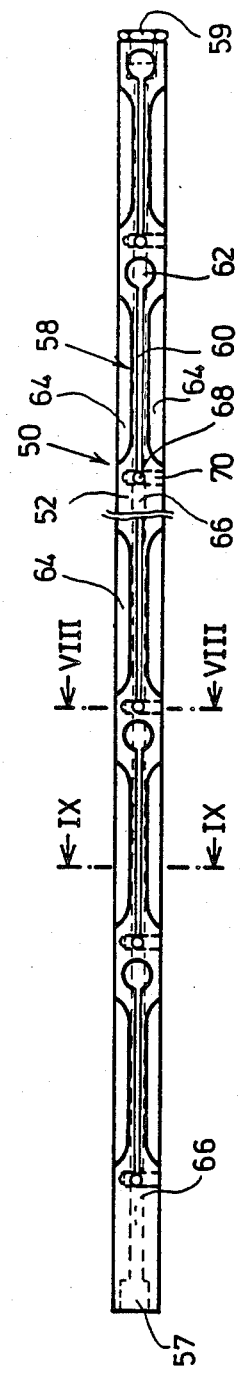
FIG. 7 is a plan view of the guiding face of the linear guide of FIG. 6, showing the longitudinal grooves.
Figure 8:
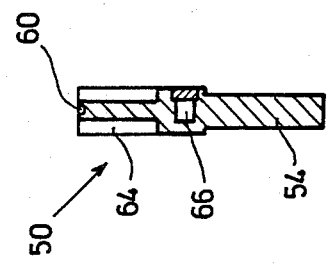
FIG. 8 is a cross-sectional view taken along line VIII—VIII in FIG. 7.
Figure 9:
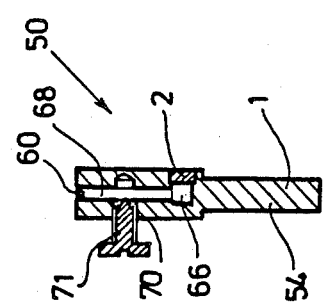
FIG. 9 is a cross-sectional view taken along line IX—IX of FIG. 7.
Figure 10:
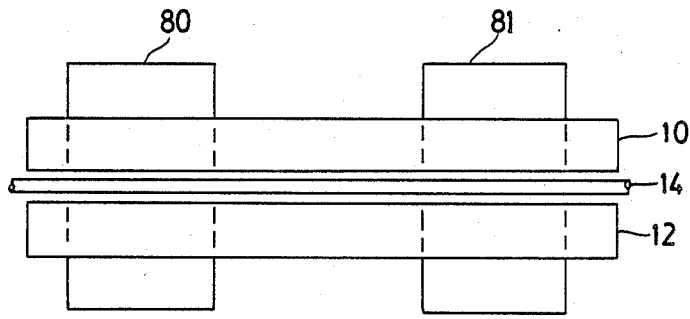
FIG. 10 is a diagrammatic elevational view representing two edge-machining tools in tandem.

According to FIG. 7, the longitudinal grooves 48 each have a longer, narrow main section 60 which at one end merges with a circular end section 62. In the area of the narrow main section 60, the guiding face 52 tapers in width, so that lateral, pocket-like areas 64 result. These are rounded at the ends.

At the ends of the narrow main sections 60 opposite the circular end sections 62, there is an inlet 68 for the fluid, and this inlet is again connected to a passage 66 running lengthwise within the linear guide 50. In this embodiment of the linear guide, too, the rate of flow of the fluid running from the feed passage 66 into the longitudinal groove 60 can be regulated by a throttle screw 71 carried in a threaded bore 70, which varies the cross section of the inlet 68.

The two embodiments described above differ essentially in the shape of the longitudinal grooves and of the guiding faces. While in FIGS. 2 to 5 they have a width that is approximately constant over the length, in FIGS. 6 to 9 they are of somewhat more complex shape. Both types, however, assure extremely low friction and an effective protection of the gap between the linear guide and the metal strip from the chips that are produced. While the first form of construction is suitable mainly for thicker strips, the second form is especially designed for thin strips of thickness of, e.g., several tenths of a millimeter. While thicker strips have a width that is greater than that of the linear guide, it is necessary in the case of thin, i.e., less stable strips, to have full-area guidance interrupted only in the area of the cutting tools disposed in the pocket-like openings. With the present invention, therefore, two suitable linear guides are made available for the performance of the process described above for any material that is to be edged.

There has thus been shown and described a novel process and a linear guide for edging metal strip material which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. A process for edging metal strip, especially nonferrous metal strip, by means of an edging machine, comprising the steps of:
    (a) longitudinally moving in a longitudinal direction and guiding metal strip between an upper and a lower linear guide, having a middle part, with tools for machining strip edges disposed in tandem in the direction of movement of the strip, laterally of the guides; and
    (b) forcing a liquid under pressure between the metal strip and each linear guide from the middle part of the guide, at individual points spaced apart in the direction of movement.

2. The process according to claim 1, wherein said liquid is a circulated cutting oil emulsion.

3. A linear guide for carrying out a process for edging metal strip, especially non-ferrous metal strip, by means of an edging machine, comprising the steps of longitudinally moving and guiding metal strip between an upper and a lower linear guide with tools for machining strip edges disposed in tandem in a direction of movement of the strip, laterally of the guides, and forcing a liquid under pressure between the metal strip and each linear guide from the middle part of the guide, at individual points spaced apart in the direction of movement, comprising:

a guiding face for confronting the metal strip;
   longitudinal grooves formed in said face which are spaced apart from one another and run approximately centrally in the lengthwise direction of the guide;

liquid inlets connected to supply said longitudinal grooves; and a transverse groove embedded in said guiding face in the area of each of said inlets.

4. A linear guide according to claim 3, wherein said longitudinal grooves have, at least in partial areas, a width which corresponds approximately to at least one-third of the adjoining width of said guiding face.

5. A linear guide according to claim 3, wherein said longitudinal grooves have longitudinal spacing and have a principal width, said longitudinal spacing being in the order of magnitude of the principal width of said longitudinal grooves.

6. A linear guide according to claim 3, wherein said longitudinal grooves have ends rounded in a semicircular manner.

7. A linear guide according to claim 3, wherein the linear guide width is substantially constant and equal to about 57 mm and said longitudinal grooves have a groove width of about 20 mm, a length of about 322 mm, a longitudinal separation of about 27 mm, and a depth of about 2 mm.

8. A linear guide according to claim 3, wherein said transverse groove embedded in said guiding face in the area of each of the inlets has a lesser depth than said longitudinal grooves.

9. A linear guide according to claim 8, wherein said transverse groove has a length slightly exceeding the width of said longitudinal grooves.

10. A linear guide according to claim 9, wherein said transverse groove has a width of about 52 mm, and a depth of about 0.5 mm.

11. A linear guide according to claim 3, wherein said longitudinal grooves have widths that are variable over their length.

12. A linear guide according to claim 11, wherein its width is variable over its length at least in the area of the guiding face portions corresponding to said longitudinal grooves.

13. A linear guide according to claim 12, wherein said longitudinal grooves are elongated and narrow and are expanded circularly at one end, and wherein said guiding face is tapered in width in the area of the narrow groove width.

14. A linear guide according to claim 13, wherein the guiding face has a normal width and the longitudinal ends of the tapered areas of the guiding face merge gradually, as rounded, with the normal width of the guiding face.

15. A linear guide according to claim 11, wherein said longitudinal grooves have in their narrow portion a width of about 2 mm for a tapered width of the guiding face of about 5 mm, as well as otherwise a width of up to about 10 mm in the case of a normal width of the guiding face of about 15 mm, and a depth of about 2 mm.

16. A linear guide according to claim 11, wherein said longitudinal grooves, in the case of a normal width of the linear guide track of about 15 mm, have a length of about 70 mm and a distance apart of about 5 mm.

17. A linear guide according to claim 3, wherein said liquid inlets, looking in the direction of strip movement, each lie in the area of the beginning of the longitudinal grooves.

18. A linear guide according to claim 17, wherein said liquid inlets are connected to a passage running in the interior of the guide in the lengthwise direction thereof.

19. A linear guide according to claim 17, wherein said liquid inlets have a throttle screw which can be turned in a threaded bore and which regulates the rate of the flow of the liquid by varying the cross section of said liquid inlets.

20. A linear guide for carrying out a process for edging metal strip, especially non-ferrous metal strip, by means of an edging machine, comprising the steps of longitudinally moving and guiding metal strip between an upper and a lower linear guide with tools for machining strip edges disposed in tandem in a direction of movement of the strip, laterally of the guides, and forcing a liquid under pressure between the metal strip and each linear guide from the middle part of the guide, at individual points spaced apart in the direction of movement, comprising:

a guiding face for confronting the metal strip;

longitudinal grooves formed in said face which are spaced apart from one another and run approximately centrally in the lengthwise direction of the guide, the width of the guide being variable over its length at least in the area of guiding face portions corresponding to said longitudinal grooves;

liquid inlets connected to supply said longitudinal grooves; and a transverse groove embedded in said guiding face in the area of each of said inlets.

* * * * *

UNITED STATES PATENT AND TRADEMARK OFFICE
CERTIFICATE OF CORRECTION

PATENT NO. : 4,793,749

DATED : December 27, 1988

INVENTOR(S) : Rolf Julius

It is certified that error appears in the above-identified patent and that said Letters Patent is hereby corrected as shown below:

Column 1, line 51 for "A suitable" read

-- A linear guide suitable --.

Column 3, line 21 for "i achieved" read

-- is achieved --.

Signed and Sealed this

Fourth Day of September, 1990

Attest:

HARRY F. MANBECK, JR.

*Attesting Officer*  *Commissioner of Patents and Trademarks*